United States Patent [19]

Ulichney

[11] Patent Number: 5,233,684
[45] Date of Patent: Aug. 3, 1993

[54] METHOD AND APPARATUS FOR MAPPING A DIGITAL COLOR IMAGE FROM A FIRST COLOR SPACE TO A SECOND COLOR SPACE

[75] Inventor: Robert A. Ulichney, Stow, Mass.

[73] Assignee: Digital Equipment Corporation, Maynard, Mass.

[21] Appl. No.: 545,384

[22] Filed: Jun. 26, 1990

[51] Int. Cl.$^5$ .............................................. G06F 15/62
[52] U.S. Cl. ....................................... 395/131; 340/703
[58] Field of Search ........................ 395/131; 340/703; 358/80

[56] References Cited

U.S. PATENT DOCUMENTS

| | | | |
|---|---|---|---|
| 4,400,719 | 8/1983 | Powers | 358/21 R |
| 4,597,005 | 6/1986 | Baleshta et al. | 358/12 |
| 4,768,082 | 8/1988 | Hiratsuka et al. | 358/13 |
| 4,791,476 | 12/1988 | Chauvel | 358/13 |
| 4,816,898 | 3/1989 | Farley et al. | 358/11 |
| 4,837,722 | 6/1989 | Sara | 364/723 |
| 4,959,711 | 9/1990 | Hung et al. | 358/80 |
| 4,979,032 | 12/1990 | Alessi et al. | 358/80 X |
| 5,053,866 | 10/1991 | Johnson | 358/80 X |
| 5,065,234 | 11/1991 | Hung et al. | 358/80 |

OTHER PUBLICATIONS

G. Wyszecki et al., Color Science, "Concepts and Methods, Quantitative Data and Formulae," 2nd ed., 1982, pp. 164-169.
G. Meyer et al., Computer Graphics, "Perceptual Color Spaces for Computer Graphics", vol. 14, No. 3, 1980, pp. 254-261.
G. Joblove et al., Computer Graphics, "Color Spaces for Computer Graphics", vol. 12, No. 3, 1978, pp. 20-27.
A. Naiman, *The Visual Computer,* "Color Spaces and Color Contrast", vol. 1, 1985, pp. 194-201.
A. Lehar et al., IEEE Computer Graphics, "High-Speed Manipulation of the Color Chromaticity of Digital Images", vol. 4, No. 2, 1984, pp. 34-39.
RObert A. Ulichney, Proc. OSA Applied Vision, "Challenges in Device—Independent Image Rendering", Jul. 12-14, 1989.
CCIR, *Recommendation* 601, "Encoding Parameters of Digital Televison for Studios", 1982.

Primary Examiner—Mark K. Zimmerman
Attorney, Agent, or Firm—Kenyon & Kenyon

[57] ABSTRACT

A method and apparatus including two look-up operations in two series coupled look-up tables coupled to an output of a dynamic quantization device to provide on-line representation mapping of digital color data from a first color space to a second color space.

8 Claims, 4 Drawing Sheets

METHOD AND APPARATUS FOR MAPPING A DIGITAL COLOR IMAGE FROM A FIRST COLOR SPACE TO A SECOND COLOR SPACE

FIELD OF THE INVENTION

The present invention is directed to a method and apparatus for mapping a digital color image from a first color space, used, for example, to store and manipulate data relating to the digital color image, to a second color space wherein, for example, the data is suitable for use in displaying the color image on a monitor. More particularly, the present invention provides a method and apparatus for color representation mapping that is less computationally intense during on-line operation than known methods and is suitable for use with a relatively small and inexpensive frame buffer.

BACKGROUND OF THE INVENTION

Many modern computer systems are provided with a color display device to display in full color output information such as, for example, graphic images. In one example, the color display device comprises a color monitor having a cathode ray tube. The cathode ray tube includes a screen with red, green and blue phosphors. An electron gun arrangement provided in the color monitor includes a red electron gun, a green electron gun and a blue electron gun. The electron guns are operated simultaneously to scan the screen from, for example, left to right, through a series of rows from the top of the screen to the bottom of the screen.

During the traversal of each row, the electron gun arrangement transmits a series of simultaneous red, green and blue signals to the color phosphors of the screen at a series of horizontally spaced points or locations within the particular row on the screen. Each point or location on the screen that receives one of the series of simultaneous red, green and blue signals represents a point or element of the entire image to be displayed. The color emitted by the color phosphors at any particular point or location on the screen is a function of the relative intensities of the red, green and blue signals transmitted by the electron gun arrangement to that point. As should be understood, red, green and blue are primary colors whereby any other color can be derived from a blending of red, green and blue light depending upon the relative intensity of each primary color light.

In order to process information relating to an image to be displayed in color, it is necessary to store color data for each of the image elements that comprise the total image to be displayed, as for example, the rows of horizontal screen locations impacted by the scanning operation of the electron gun arrangement in a color monitor. Each image element is called a pixel and a storage device must be provided to store the color data for each pixel in an orderly manner so that the pixel data can be retrieved from the storage device and processed to control the operation of the display device, in our example, the electron gun arrangement. A frame buffer is a data storage device typically used in standard display systems to temporarily store digital pixel data for a color image to be displayed on the display device.

Color can be regarded as a three-dimensional value, which means that three values, sometimes referred to as a color triplet, can be used to define a particular color in a unique fashion. The above-described color monitor operates on the basis of color definition provided by the red, green and blue constituents of the color for each pixel. Accordingly, the data for each pixel can comprise a red value, a green value and a blue value.

A "color space" refers to a three-dimensional space used to define, by analogy, the three values required to represent a particular color. For example, in the operation of the electron gun arrangement of the color monitor, each color comprises a red component, a green component and a blue component. This color information can be defined in terms of an RGB (red-green-blue) space with X, Y and Z rectangular coordinates corresponding to the red, green and blue components, respectively. The X, Y and Z coordinates define a volume with any given point within the volume corresponding to a unique color represented by the red, green and blue values of the coordinates of that point.

An RGB space is a convenient color space for use in storing color information because both the electron gun arrangement and color phosphor structure of the screen operate on the basis of red, green and blue constituent signals to provide color. However, present knowledge of human physiology indicates that the human visual system processes color information in accordance with an achromatic and two chromatic dimensions that can be defined in terms of a luminance-chrominance color space. The achromatic dimension of the luminance-chrominance color space is related to the "brightness" of the color and the chromatic dimensions are separated into two so-called "opponent" chrominance dimensions: red versus green and blue versus yellow.

Thus, when color information is stored in accordance with an RGB space definition of color, some processing modifications to the values of the red, green and blue components to, for example, adjust the color image on the monitor screen will usually not result in a high perceptual quality to a human user. Moreover, it has been found that color images are more efficiently compressed and manipulated in a luminance-chrominance space than in a conventional RGB space.

Accordingly, it has been recognized that it would be desirable to store color information in accordance with achromatic and chromatic dimensions and to process the achromatic dimension separately from the chromatic dimension to provide image processing that is efficient and that also more closely coincides with the fundamental color processing mechanisms of human perception. For example, the major television broadcast standards worldwide have adapted a standard linear color space, called a YUV space, for use in processing color signals. Y corresponds to luminance, and is a function of the relative luminosity of each of the color phosphors used in the television screen. The U and V components closely approximate the red/green and blue/yellow opponent chrominance dimensions of the human visual system. More precisely, the U and V components correspond to (red - luminance) and (blue - luminance) values, respectively.

Since each color space can be represented geometrically as a three dimensional space, it is possible to map a color triplet expressed in values defined in one color space to a corresponding color triplet expressed in values defined in another color space through execution of appropriate formulae. The formulae that represent the transformation from one color space to another color space are derived from a geometric relationship between the color spaces when one of the color spaces is viewed as entirely enclosed within the other color space, i.e. a first color space is a subspace of a second color superspace.

For example, the rectangular coordinates of an RGB space for all colors defines a rectangular solid with each axis extending from zero to unity for a respective one of the red, green and blue constituents for the colors within the RGB space. Zero would equate to a minimum value for the red, green or blue, that is no red, green or blue component in a color triplet, as the case may be, and unity would represent a pure hue for the respective red, green or blue component represented by the particular axis.

If the RGB space were viewed as completely enclosed within a three dimensional space defined by, e.g., a YUV space, the RGB space would comprise a parallelepiped relative to the rectangular solid defined by the rectangular Y, U, and V axes due to known relationships between the achromatic and chromatic dimensions of YUV space and the red, blue and green constituents of the RGB space. Accordingly, the YUV space is of larger dimensions than the RGB space to completely enclose the parallelepiped for all colors, as defined by the RGB space.

It has been determined, e.g., that an RGB space completely enclosed by a YUV space would only occupy 23.3% of the volume of the YUV superspace. Any point within the RGB space would also comprise a point within the YUV space because, in this analysis, the RGB space is a subspace of the YUV space. The following matrix formula has been derived to express a YUV color triplet in terms of the corresponding red, green and blue values of a point representing the triplet within the RGB subspace:

EQUATION A $$\begin{bmatrix} Y \\ U \\ V \end{bmatrix} = \begin{bmatrix} 0.299 & 0.587 & 0.114 \\ -0.147 & -0.289 & 0.437 \\ 0.615 & -0.515 & -0.100 \end{bmatrix} \cdot \begin{bmatrix} R \\ G \\ B \end{bmatrix}$$

The reverse transformation can be written as the inverse of Equation A.

As should be understood, the above discussed matrix formulae provide a basis for storing and manipulating color triplets in a first color space, e.g., a YUV space, for more efficient and higher quality color processing and, thereafter, transforming or mapping the YUV triplets for the pixels of an image to a second color space, e.g., a corresponding RGB space to provide color triplets that can be effectively used to operate a red, green, blue phosphor monitor, for display of the pixels of the image. However, the transformation process requires nine multiplications per pixel in a YUV to RGB translation, and is therefore, highly computationally intensive, particularly when a full color display is desired. A full color display may require 24 bits per pixel for a high quality, full definition of color value. Moreover, the manipulation of YUV color triplets during color processing can project the color triplet values to portions of the YUV space that lie outside the RGB subspace. Thus, these new YUV values define points that are not translatable into RGB values that can be displayed on a color monitor. Consequently, the computations required for manipulation in a first color space and mapping of color values to a second color space for display would also include data processing to effectively project "infeasible" or out-of-range YUV values to points within the RGB subspace that are suitable for display. The above discussion pertains to any translation from a first color space to a second color space. Indeed, in a translation from the CIELUV international standard space to an RGB space, the translation computations are more complex than matrix multiplication as they include, e.g., a cube.

There currently does not exist any general purpose processor than can execute video rate color transformations, much less out-of-range mapping. Moreover, the frame buffers used in the display monitor systems of many computers are of limited size and cannot store sufficient data for each pixel of a color image to display a full color image on the monitor screen.

The prior art has provided methods for displaying an illusion of true color that are generally referred to as dynamic quantization methods. One such dynamic quantization method is called dithering, wherein, during on-line operation, each component of a color triplet input to the standard display monitor system is compared to preselected quantized values for that component and assigned a certain one of the preselected quantized values, as a function of a predetermined relationship between the actual value of the component and the quantized values, so that the assigned quantized value can be used as a representation of the respective actual component for display purposes. Thus, the total number of distinct color triplets available to define each pixel and for storage in the frame buffer of the display monitor system, is reduced to the product between the numbers selected as the quantized values for the respective components of the color triplet.

For example, in an RGB space, a designer can select four distinct quantized red values, four distinct quantized green values and four distinct quantized blue values for a total number of 64 distinct color triplets $(4 \times 4 \times 4)$. Each red, green and blue value for each pixel to be displayed is processed to assign a representative corresponding red, green and blue value from among the preselected four quantized values for each respective RGB component, so that an illusion of full color display is achieved by relying upon the 64 preselected specific colors.

Accordingly, in this example, a six bit binary number $(2^6=64)$ can be used to uniquely identify each one of the 64 quantized color triplets and a relatively small capacity frame buffer would be sufficient to store the dithered digital RGB data for each pixel.

In such known dithering systems, the six bit number stored in the frame buffer for each pixel would be used as an index to a look-up table in the display monitor system that contains a full twenty four bit representation of the color corresponding to each particular six bit index number. The twenty four bit representation of the color triplet is then used to display the pixel on the monitor. The storage space required for the twenty four bit representation is not prohibitive because of the limited total number, in our example 64, of color triplets used for display purposes. On the other hand, a full color display would require the storage of a twenty four bit number for each pixel, as discussed above, requiring a relatively large storage capacity for the frame buffer that can be cost prohibitive in certain desk top computer environments.

However, the dithering method, as well as other known dynamic quantization methods, do not alleviate the on-line computational processing required when the color triplets input to the display system are in a first color space, such as a YUV space, and must be translated to a second color space, such as an RGB space, for control of the monitor.

SUMMARY OF THE INVENTION

The present invention provides a method and apparatus to map color triplets from a first color space to a second color space, during on-line operation, and at speeds that permit real time, interactive graphics data processing. Generally, the present invention comprises an image rendering system coupled to a display system wherein the data input to the image rendering system comprises pixel data expressed in terms of a first color space, such as a YUV space, and the display system operates on the basis of a second color space, such as an RGB space native to a red, green, blue phosphor monitor.

Pursuant to a feature of the present invention, the image rendering system includes a dynamic quantization color processing device to process each of the components of each color triplet input to the image rendering system and thereby provide corresponding, representative quantized color values, defined in terms of the first color space, for each component of each pixel of an image to be displayed. The bits representing a composite of the quantized first space color values of the components of each input color triplet of each particular pixel are used as a collective transformation index to a first look-up table. The first look-up table provides a corresponding color index for each collective transformation index.

The color index for each pixel is input to the display system and stored in a frame buffer memory. For display of the image, the display system uses each color index stored in the frame buffer to access a second look-up table containing, for each unique color index, an n-bit representation (wherein, e.g. n=24) of a color corresponding to the original collective transformation index, yet defined in terms of the second color space suitable for the monitor. The n-bit representations of the second look-up table are used to display the image.

The number of quantization levels for each component of the first space color triplets is selected, as in known dynamic quantization methods, so that the number of entries in the first look-up table is suitable for fast access and the number of bits required to uniquely identify each quantized color value is minimized to minimize the storage space necessary for storage of the quantized values for all of the pixels of an image.

Moreover, pursuant to another feature of the invention, the total number of quantization levels for quantization in the first color space is selected to closely approximate the ratio defined by the number of indexed locations available in the second look-up table divided by the volume ratio between the second color space, which is defined as a subspace of the first color space, and the first color space. The use of the above ratio provides greater precision in the quantization of color values by taking advantage of the volume ratio inherent in superspace to subspace color mapping. Thus, a greater number of quantization levels are used for higher color definition quantization in the first color space before mapping to the smaller second color space used to, e.g., operate a color monitor.

Thus, pursuant to the present invention, the reduced number of color triplets resulting from the dynamic quantization of the color values is advantageously utilized to build two look-up tables containing the map information necessary to map a color triplet from a first color space to a second color space. Accordingly, the color matrix computations are replaced by a far faster look-up operation and the only computation required in the color mapping according to the present invention is the generation of the collective transformation indexes from the quantized values of the first color space triplets. This results in processing speeds that permit real time, interactive color graphics processing with the advantages of processing pixel data in, e.g., a YUV luminance-chrominance space.

All of the computationally intense processing required to map each quantized color triplet from its first space values to the corresponding second space values via the collective transformation and color indexes need be done only once at initialization of the system, off-line and prior to on-line operation, to fill in the look-up tables. To that end, the present invention provides a color transformation table generator that is coupled to each of the image rendering system and the display system. Information regarding each of the first and second color spaces, to be used in the display system, the relationship between the color spaces, the size of the look-up tables and the formulae required for mapping from the first selected color space to the second selected color space are input to the color transformation table generator. The color transformation table generator is then operated off-line at system initialization to compute the number of quantization levels, to determine each quantized color triplet based upon the quantization levels and to map each selected quantized color triplet from the first space to the second space for input to the first and second look-up tables.

DETAILED DESCRIPTION

Figure 1:
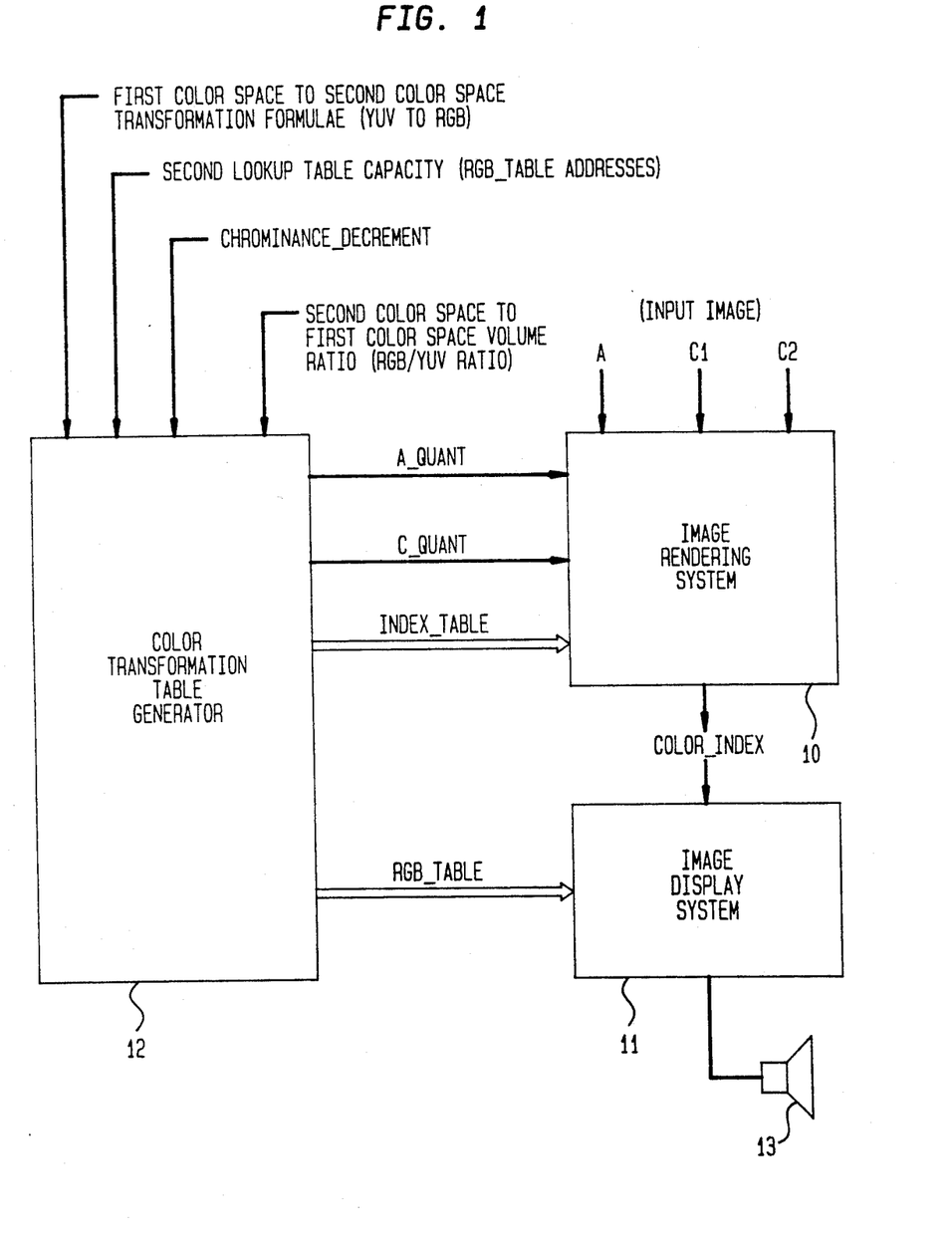
FIG. 1 is a block diagram of a color image processing system according to the present invention.

Referring now to the drawings, and initially to FIG. 1, there is illustrated, in block diagram form, an image processing system according to the present invention. The system is described and illustrated in respect of a first color space which comprises a luminance-chrominance space, such as a YUV space and a second color space which comprises an RGB space. However, the general principles of the invention pertain to a color transformation from any first color space to any second color space. The image processing system generally comprises three basic components: an image rendering system 10; an image display system 11; and a color transformation table generator 12.

As illustrated in FIG. 1, the image rendering system 10 includes three inputs, each input corresponding to one of the components of each pixel color triplet input to the image rendering system. In a luminance-chrominance color space, the components would comprise an achromatic component A, such as the Y value of the YUV space and two chromatic components C1 and C2, e.g., the U, V components of the YUV space.

The image rendering system 10 operates to process the A, C1 and C2 values for each pixel and then dither the A, C1 and C2 components to reduce the total number of distinct color triplets to be stored for display purposes, as described above. In accordance with a feature of the invention, the image rendering system 10 includes a first look-up table accessed by addresses based upon the dithered A, C1 and C2 values of the components of each pixel, as will be described in more detail below in respect of FIG. 2, to provide color index output signals, one per pixel.

Pursuant to a feature of the invention, the color index for each pixel is input to the image display system 11 and stored in a frame buffer memory, as will appear, for use to control, e.g., a color monitor 13 that is coupled to an output of the image display system 11. Each color index provides an address to a second look-up table, arranged in the image display system 11, to access a corresponding location in the second look-up table that contains color data corresponding to the color triplet represented by the respective color index and defined in terms of a second color space, as, for example, RGB values, to control the monitor 13.

In accordance with another feature of the present invention, the color transformation table generator 12 operates off-line, at initialization of the image processing system illustrated in FIG. 1, to build the first and second look-up tables of the image rendering system 10 and image display system 11, respectively. To that end, various preselected data are input to the color transformation table generator 12 to provide information relevant to the first and second color spaces selected for use in the image processing system, in our example, a luminance-chrominance color space, such as YUV, and an RGB space, respectively.

As illustrated in FIG. 1, the preselected data input to the color transformation table generator 12 includes first color space-to-second color space transformation formulae information, second look-up table capacity, i.e., the number of uniquely addressable locations within the second look-up table, a chrominance-decrement integer, as will be described below, and the second color space-to-first color space volume ratio. When the first color space is a YUV space and the second color space is an RGB space, the first color space-to-second color space transformation formulae information would comprise the transformation matrix formulae set forth as the inverse of Equation A above and the color space volume ratio would equal 0.233, as described previously. In this manner, the color transformation table generator 12 would be operational to translate any YUV color triplet to corresponding RGB values.

The second look-up table capacity, chrominance decrement and second color space-to-first color space volume ratio information enables the color transformation table generator 12 to determine the appropriate level of quantization levels for dithering by the image rendering system 10 and the corresponding dithered color triplet values in the first color space, and together with the color transformation formulae information available in the color transformation table generator 12, to calculate a unique color index relating to the second color space for each of the dithered color triplets of the first color space, as will appear.

Referring once again to FIG. 1, the color transformation table generator 12 generally includes four outputs, as follows:

i) an A—quant output signal coupled to the image rendering system 10, that indicates the number of quantization levels determined by the color transformation table generator 12 for the first component of the first color space triplet, in our example the achromatic Y component of the YUV color space.

ii) a C—quant output signal, coupled to the image rendering system 10, that indicates the number of quantization levels for each of the chromatic components of the first color space such as the U and V components of the YUV color space.

iii) an index—table output signal to transmit each calculated color—index, coupled to the image rendering system 10, for building the first look-up table.

iv) an RGB—table output signal coupled to the image display system 11 to provide corresponding second color space values such as RGB—values, for each calculated color—index to build the second look-up table.

The following description of FIGS. 2-14 will describe in detail the structure and operation of each of the image rendering system 10, image display system 11 and color transformation table generator 12 of the image processing system according to the present invention, as depicted in FIG. 1.

Figure 2:
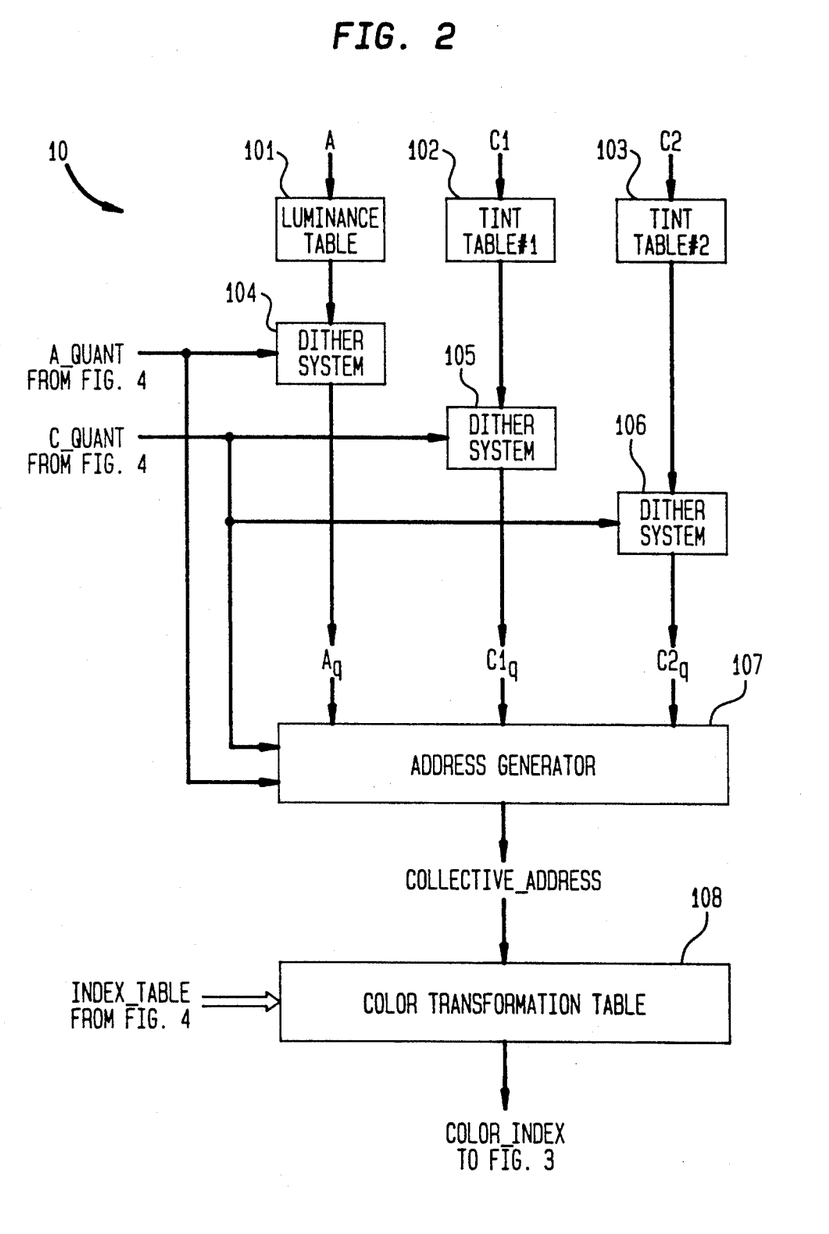
FIG. 2 is a block diagram of the image rendering system illustrated in the system of FIG. 1.

Referring now to FIG. 2, the image rendering system 10 includes a luminance table 101, a first tint table 102 and a second tint table 103. The A component of each pixel is input to the luminance table 101, the C1 component is input to the first tint table 102 and the C2 component is input to the second tint table 103.

Each of the luminance table and first and second tint tables 102, 103 can comprise a look-up table containing adjusted values for certain color triplet values to adjust for imperfections and non-linearities in the particular monitor 13 used in the system, to compensate for poor quality source images and to achieve color adjustments desired by a designer or user of the system, as is well known in the art.

An adjusted pixel value output of the luminance table 101 and each of the first and second tint tables 102, 103 is coupled to a respective quantization system, such as a dither system, 104-106. Each dither system operates to perform any one of the dithering methods described in *Digital Halftoning* (Ulichney, The MIT Press 1987) (hereby expressly incorporated by reference) to dither each component of each adjusted pixel value output by the luminance table 101 and the first and second tint tables 102, 103, generally as described above, to provide corresponding quantized values for each pixel component, designated in FIG. 2 as Aq, C1q and C2q outputs of the respective dither systems 104-106.

The A—quant and C—quant values determined and output by the color transformation table generator 12, as a function of the second look-up table capacity, chrominance-decrement and second color space-to-first color space volume ratio information, as will be described in detail below, are also input to the dither systems 104-106, as illustrated in FIG. 2. The level of quantization performed by each dither system 104-106 to quantize the respective components of the color triplet comprising each pixel is controlled by the A— quant and C—quant inputs. Each pixel output Aq, C1q and C2q of the dither systems 104-106 will have a value equal to one of the A—quant or C—quant number of preselected values for the respective component Aq, C1q or C2q, as the case may be, as determined by the respective dither systems 104-106. The total number of distinct color triplet values that can be collectively output by the dither systems 104-106 will equal A—quant $\times$ C—quant$^2$.

The quantized values Aq, C1q and C2q are input to an address generator 107 that operates to generate a collective-address output for each pixel as a function of the values of the Aq, C1q and C2q values of the respective pixel color triplet. The address generator 107 can comprise an electronic data processing unit programmed to generate a collective-address based upon the input Aq, C1q and C2q values, as follows:

collective-address = $C\_quant \times (C\_quant \times Aq + C1q) + C2q$

Address generation based on the above algorithm requires two multiplications and two additions per pixel. To reduce the computations required per pixel, an alternative approach would be to operate the address generator 107 to concatenate the bit fields used to represent the digital values of the Aq, C1q and C2q components of each pixel. The total number of bits required to represent the maximum concatenated digital values of Aq, C1q and C2q would be:

int $[\log_2 (A\_quant-1) + 1] + 2$ int $[\log_2 (C\_quant-1) + 1]$bits, wherein int [] indicates integer truncation.

The concatenation method is more computationally efficient in that it eliminates the need for multiplication. However, this method defines a number of addresses for a memory space that is higher than the total number of quantized values. Thus, a larger memory device than is actually required would be necessary. This shortcoming of the concatenation method can be overcome by providing a so-called depopulated ROM wherein the number of physical addressable locations within the ROM is reduced to a number close to the number of data elements that are to be stored irrespective of the number of bits used in each address.

As illustrated in FIG. 2, the A_quant and C_quant values determined by the color transformation table generator 12 are also input to the address generator 107 to facilitate either of the above-described address generation methods.

The collective-address generated by the address generator 107 for the pixels of an image to be displayed are input to a color transformation table 108 that comprises the first look-up table in this exemplary embodiment of the image rendering system of the present invention. The color transformation table 108 comprises an addressable memory device wherein each collective-address input to the color transformation table 108 is an address that uniquely identifies a particular data storage location within the memory device, depending upon the bit values of the bits within the collective-address. Each respective data storage location stores a color_index that corresponds to a quantized color triplet represented by the collective-address, i.e., the particular color defined by the particular Aq, C1q and C2q values used to generate the collective-address that uniquely identifies the respective data storage location.

Figure 3:
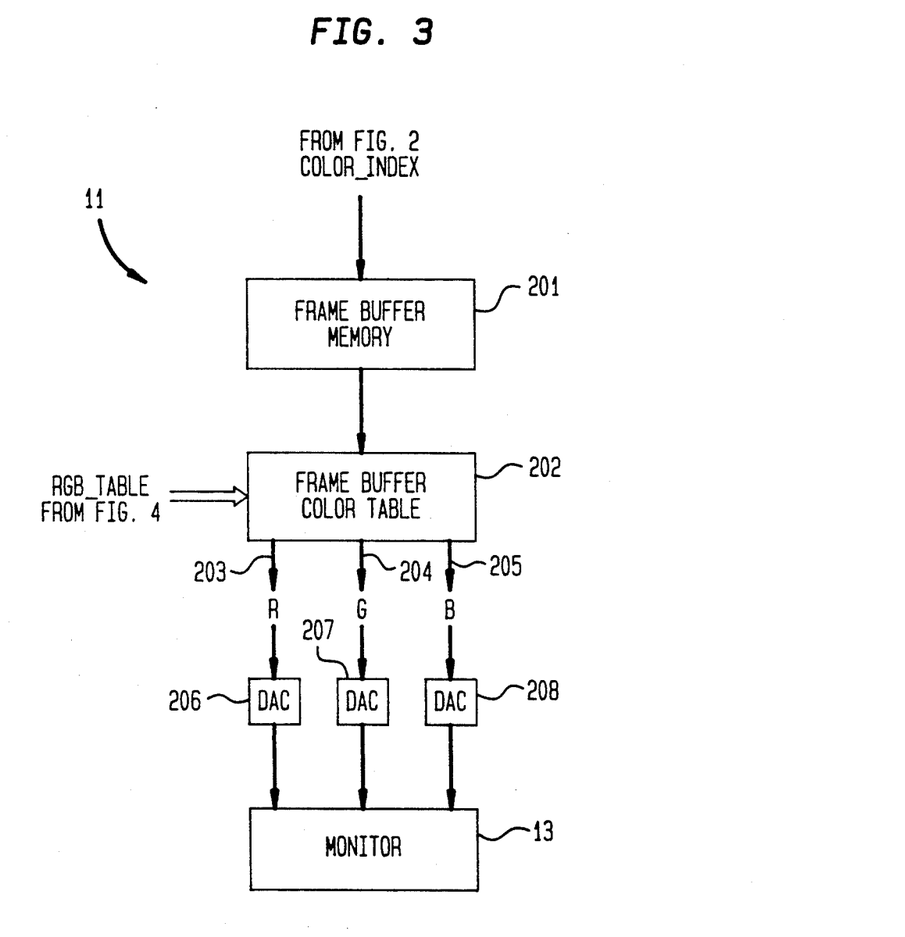
FIG. 3 is a block diagram of the image display system illustrated in the system of FIG. 1.

As described above, each color_index output by the color transformation table 108 is transmitted to the input of the image display system 11. Referring to FIG. 3, the image display system 11 includes a frame buffer memory 201 that receives and stores all of the color_index's corresponding to the pixels of an image to be displayed. When an image is to be displayed, the color_index's are output from the frame buffer memory 201, one at a time, and input to a frame buffer color table 202 that comprises the second look-up table of the present invention. The frame buffer color table 202 comprises an addressable memory device wherein each color_index uniquely identifies a particular data storage location within the frame buffer color table 202. Each data storage location within the frame buffer color table 202 stores an n-bit representation corresponding to the quantized Aq, C1q, C2q color triplet forming the collective-address originally used to look up the color_index corresponding to the respective data storage location.

Pursuant to a feature of the present invention, the n-bit representation of each quantized color triplet is expressed in terms of the second color space utilized in the image processing system, e.g., RGB values. Accordingly, the frame buffer color table 202 of the illustrated embodiment includes three outputs 203-205, one corresponding to each of the red R, green G and blue B components of the n-bit representation of a respective quantized color triplet. Each of the R, G and B outputs is input to a respective digital-to-analog converter 206-208 to provide analog control signals for input to the color monitor 13. The color monitor can comprise a known red, green and blue color phosphor monitor system operating to display the pixels of the image to be displayed.

Thus, the present invention provides an efficient double look up operation that automatically converts pixel color triplet inputs expressed in values of a first color space to output pixel color triplet values expressed in terms of a second color space. The quantized first color space color triplet based collective_address, the correspondence between the collective_address and the color_index stored at the location uniquely identified by the collective_address in the first look up table, i.e., the color transformation table 108, and the further correspondence between the color_index and the second color space n-bit color representation stored at the location uniquely identified by the color_index in the second look-up table, i.e., the frame buffer color table 202, eliminates the need for computationally intense, on-line color conversions for each pixel of an image to be displayed. Moreover, the novel arrangement of the look-up tables subsequent to a dither system facilitates fast look-up operations and a minimized storage capacity requirement for the frame buffer memory 201 inasmuch as all of the colors used for processing are reduced to the preselected limited number of quantized color values output by the dither systems 104-106.

Figure 4:
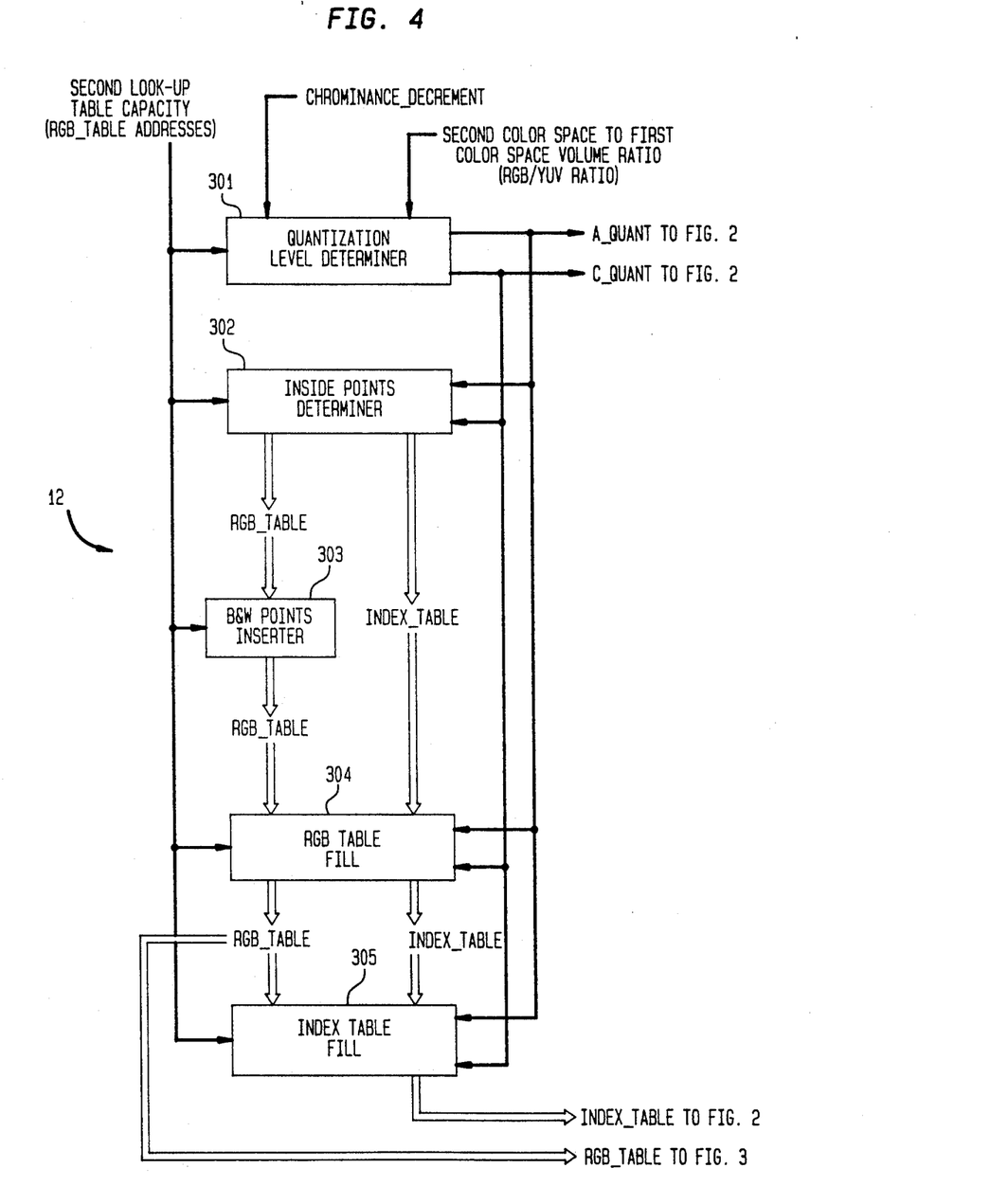
FIG. 4 is a block diagram of the color transformation table generator illustrated in the system of FIG. 1.

Referring now to FIG. 4, there is illustrated a detailed block diagram of the color transformation table generator 12 of the present invention. As described above, the color transformation table generator 12 is coupled to each of the image rendering system 10 and the image display system 11 to input quantization numbers to the dither systems 104-106 and the address generator 107 and to build the first and second look-up tables, i.e., the color transformation table 108 and the frame buffer color table 202. The color transformation table generator 12 operates off-line, at the initialization of the color image processing system, as will be described below.

The color transformation table generator 12 includes a quantization level determiner 301 having three inputs, as described above: the RGB volume ratio, the chrominance_decrement and RGB table addresses. The RGB volume ratio input provides information on the second color space-to-first color space volume ratio, in our example, the ratio between a YUV luminance-chrominance superspace and an RGB subspace. As indicated above, an RGB subspace occupies 23.3% of a YUV superspace for RGB/YUV volume ratio of 0.233.

The RGB-table addresses input is the number of uniquely identified data storage locations available in the frame buffer table 202. This number represents the number of different n-bit representations, expressed in RGB values, that can be stored in the frame buffer table 202 for use to operate the monitor 13. In an exemplary embodiment, the frame buffer table 202 comprises a RAM having 256 addressable data storage locations.

The chrominance_decrement input represents an integer by which the number of chrominance quantization levels, determined by the quantization level determiner 301, as will be described below, is reduced, to increase the number of achromatic quantization levels to provide more quantization precision for the achromatic component.

The chrominance_decrement can be, e.g., 0 or 1.

In accordance with the invention, the quantization level determiner 301 operates to determine the number of chromatic quantization levels, C_quant, using the above-described input values, as follows:

$$C\_quant' = \text{int}\left[\left(\frac{RGB \text{ table address}}{RGB \text{ volume ratio}}\right)^{\frac{1}{3}}\right] \text{ and}$$

$$C\_quant = C\_quant' - chrominance\_decrement.$$

In our example, with the first color space comprising a YUV space and the second color space comprising an RGB space, the RGB volume ratio equals 0.233. When RGB addresses is selected to be 256 locations in the frame buffer color table 202 and a chrominance_decrement is selected to equal zero, the quantization level determinator 301 calculates C_quant = 10.

Also, with the chrominance decrement equal to zero, $$A\_quant = \text{int}\left[\frac{RGB \text{ table addresses}}{(RGB \text{ volume ratio})(C\_quant)^2} + \frac{1}{2}\right]$$

When RGB table addresses equals 256, RGB volume ratio equals 0.233 and C_quant equals 10, as previously determined by the quantization level determiner 301, A_quant = 11.

The above calculations are completed to determine a total number of quantization levels, A_quant X C_quant², that is as close as possible to the fraction:

$$\frac{RGB \text{ table addresses}}{RGB \text{ volume ratio}}$$

to maximize quantization precision in the first color space before conversion of the quantized color triplet values to corresponding second color space values within the second color subspace. When A_quant equals 11 and C_quant equals 10, the total number of quantized color triplets, equal to A_quant X C_quant², will be 1100. Thus, the color transformation table 108 will have a storage capacity of 1100 addressable locations, each of the addressable locations being uniquely identified by one collective-address. The unique color_index at each location within the color transformation table 108 correlates each collective-address to one of 256 RGB values stored in the frame buffer color table 202.

The A_quant and C_quant values are output from the quantization level determiner 301 and input to the dither systems 104-106 and address generator 107, as illustrated in FIGS. 2 and 4.

An inside points determiner 302 is also arranged in the color transformation table generator 12 to perform first color space-to-second color space conversions for each quantized color triplet. Each one of the 1100 quantized YUV color triplets used by the dither systems 104-106 is processed by the inside points determiner 302 as a function of, e.g., the matrix formula described above, to convert each of the quantized YUV triplets to corresponding RGB values. To that end, the A_quant and C_quant numbers generated by the quantization level determiner 301 are input to the inside points determiner 302 for calculation of the 1100 quantized YUV triplets for conversion to RGB volumes.

Only a subset of the calculated RGB values will be "feasible" RGB values i.e., values within the RGB subspace. The number of YUV triplets is such that the number of feasible RGB values is less than the capacity of the frame buffer color table 202 leaving space for RGB values selected to represent out-of-range YUV values, as will appear. An out-of-range YUV value is defined as a YUV triplet that converts to an RGB value that is not feasible, as discussed above.

All of the feasible RGB values and the quantized YUV values corresponding to the feasible RGB values are output by the inside points determiner 302, as RGB_table and index_table values, respectively. The RGB_table addresses value, i.e., the total number of uniquely identified data storage locations available in the frame buffer color table 202, is also input to the inside points determiner 302 such that the inside points determiner 302 can pair each feasible RGB value with an address (color_index) to the frame buffer color table 202 for storage. The color_index for each feasible RGB value can then be paired with the corresponding YUV color triplet.

A B&W points inserter 303 receives as an input, the RGB_table values, i.e., the feasible RGB values, output by the inside points determiner 302. It should be noted that while the extreme points of the full RGB color space contain black and white points, the position of the RGB space within the YUV space, together with the spacing of the A_quant and C_quant points, may result in one or both of the black and white points of the RGB space not aligning with a quantized YUV point location. The B&W points inserter 303 inserts the black and/or white RGB values into the RGB_table values in the event the RGB black and/or white values do not align with any one of the quantized YUV values, so that black and white values are available. The B&W points inserter 303 will also assign a color_index for the black and/or white points inserted into the RGB_table values for storage in the frame buffer color table 202. The B&W points inserter 303 outputs the RGB_values, including the inserted RGB values for black and/or white, if necessary, with the corresponding color_index's to an input of an RGB table fill device 304.

Each of the index_table values output by the inside points determiner 302 (i.e., the quantized YUV values having feasible RGB values), as well as A_quant, C_quant and RGB_table addresses are also input to the RGB table fill device 304. As should be understood, at this point, the RGB_table values only include the feasible RGB values converted from among the 1100 quantized YUV values and the RGB values for black and white. The RGB_table fill device 304 operates to project each out-of-range YUV value having an RGB value that is not feasible (i.e., any one of the R, G and B values outside of the RGB subspace) to a point on the RGB color space surface.

Inasmuch as the operation of the color transformation table generator 12 is off-line, at system initialization, the computational complexity of any method used to project each out-of-range YUV value to the surface the RGB subspace is not of concern to the on-line operation of the color transformation system of the present invention. Accordingly, a method providing for the highest quality of YUV to RGB space projection can be selected for implementation in the RGB table fill device 304. For example, the RGB table fill device 304 can project each out-of-range YUV color triplet along a line from the point within the YUV space defined by the out-of-range YUV color triplet to the surface of the RGB space, wherein the line of projection is calculated by the RGB table fill device 304 to have a constant hue angle and a constant Y component. This will maintain constant hue and brightness for the color, as between the out-of-range YUV color triplet and the point on the RGB surface intersected by the calculated line of projection.

The RGB table fill device 304 performs a projection for each out-of-range YUV value to the surface of the RGB space and calculates the distance of each out-of-range YUV value to the point of intersection on the RGB space surface. The RGB values at the points of intersection on the surface of the RGB space found from the projection calculations of the RGB table fill device 304 are than sorted by the RGB table fill device 304, from the shortest distance to the longest distance, and listed in shortest distance to longest distance order. The RGB surface values are then selected from the list, one at a time, in shortest distance to longest distance order and assigned a corresponding color_index from among those color_index's identifying the yet unused data storage locations within the RGB table until the RGB table is filled.

The RGB table fill device 304 then outputs each of the RGB values of the RGB table to the frame buffer color table 202 for storage, each RGB value being stored in the data storage location of the frame buffer color table 202 uniquely identified by the color_index assigned to the respective RGB value by the inside points determiner 303, B&W points inserter 303 or RGB table fill device 304, as the case may be.

An index table fill device 305 receives as inputs the RGB table values, the index table values, A_quant, C_quant and the RGB table addresses. The index table fill device 305 utilizes the input information to determine each yet unassigned out-of-range YUV triplet and operates to calculate which one of the RGB table values is the shortest distance from the projection of the respective out-of-range YUV triplet on the RGB surface. The index table fill device 305 then assigns the color_index for the RGB table value that is the shortest distance from the respective out-of-range YUV triplet projected RGB surface point to that respective out-of-range YUV value.

Of course, the index_table values input to the index table fill device 305 includes the YUV values convertable to feasible RGB values and the corresponding color_index for each of those YUV values, as assigned by the inside points determiner 302. After completion of the shortest distance calculation and assignment of color_index's for the RGB table values to the out-of-range YUV triplets, the index table fill device 305 has all of the information necessary to fill the color transformation table 108 of the image rendering system 10. The index table fill device 305 then outputs each of the YUV triplets, each as a collective_address to the color transformation table 108 and the color_index assigned to the respective YUV triplet is stored at the location of the color transformation table 108 uniquely identified by the collective_address formed by the respective YUV color triplet.

What is claimed is:

1. An apparatus for mapping a digital color image comprising a plurality of pixel data elements, from a first color space to a second color space, which apparatus comprises:

a dynamic quantization device adapted to quantize each of the plurality of pixel data elements, represented in first color space components, to one of a preselected set of quantized color data values, represented in the first color space components;

a first look-up table coupled to said dynamic quantization device, said first look-up table receiving as input the quantized color data values corresponding to the plurality of pixel data elements;

said first look-up table containing a color index for each one of the quantized color values and being adapted to output a respective color index accessed by each one of the quantized color data values input to said first look-up table;

a second look-up table coupled to said first look-up table, said second look-up table receiving as input each color index accessed by the quantized color data values input to said first look-up table;

said second look-up table containing a unique n-bit data element for each color index and being adapted to output a respective n-bit data element in response to input of each color index accessed by the quantized color data values input to the first look-up table;

wherein each n-bit data element corresponds to at least one of the preselected set of quantized color data values and represents a respective corresponding at least one quantized color data value in second color space components;

wherein there are a fixed number of color indices, and wherein a number of quantized color data values in the preselected set of quantized color data values equals: the number of color indices divided by a second color space-to-first color space volume ratio;

a look-up table generator coupled to each of the first and second look-up tables for generating and storing the color indices and the n-bit data elements in the first and second look-up tables, respectively;

wherein said look-up table generator is coupled to said dynamic quantization device and generates, as a function of the fixed number of color indices, and transmits to the dynamic quantization device, the number of quantized color data values in the preselected set of quantized color data values.

2. An apparatus for mapping a digital color image comprising a plurality of pixel data elements, from a first color space to a second color space, which apparatus comprises:

a dynamic quantization device adapted to quantize each of the plurality of pixel data elements, represented in first color space components, to one of a preselected set of quantized color data values, represented in the first color space components;

a first look-up table coupled to said dynamic quantization device, said first look-up table receiving as input the quantized color data values corresponding to the plurality of pixel data elements;

said first look-up table containing a color index for each one of the quantized color values and being adapted to output a respective color index accessed by each one of the quantized color data values input to said first look-up table;

a second look-up table coupled to said first look-up table, said second look-up table receiving as input each color index accessed by the quantized color data values input to said first look-up table;

said second look-up table containing a unique n-bit data element for each color index and being adapted to output a respective n-bit data element in response to input of each color index accessed by the quantized color data values input to the first look-up table;

wherein each n-bit data element corresponds to at least one of the preselected set of quantized color data values and represents a respective corresponding at least one quantized color data value in second color space components;

an address generator intercoupling said dynamic quantization device and said first look-up table, said address generator generates an address for each quantized data value output by said dynamic quantization device as a function of each respective quantized data value for access to said first look-up table;

wherein said first color space comprises a YUV color space and said second color space comprises an RGB color space, and wherein said address generator concantonates digital Y, U and V values of each one of the quantized color data values input to said address generator to generate the respective address.

3. An apparatus for mapping a digital color image comprising a plurality of pixel data elements, from a first color space to a second color space, which apparatus comprises:

a dynamic quantization device adapted to quantize each of the plurality of pixel data elements, represented in first color space components, to one of a preselected set of quantized color data values, represented in the first color space components, the dynamic quantization device including a color dithering system;

a first look-up table coupled to said dynamic quantization device, said first look-up table receiving as input the quantized color data values corresponding to the plurality of pixel data elements;

said first look-up table containing a color index for each one of the quantized color values and being adapted to output a respective color index accessed by each one of the quantized color data values input to said first look-up table; and a second look-up table coupled to said first look-up table, said second look-up table receiving as input each color index accessed by the quantized color data values input to said first look-up table;

said second look-up table containing a unique n-bit data element for each color index and being adapted to output a respective n-bit data element in response to input of each color index accessed by the quantized color data values input to the first look-up table;

wherein each n-bit data element corresponds to at least one of the preselected set of quantized color data values and represents a respective corresponding at least one quantized color data value in second color space components.

4. A method for mapping a digital color image comprising a plurality of pixel data elements, from a first color space to a second color space, comprising the steps of:

(a) quantizing each one of the plurality of pixel data elements represented in first color space components to one of a preselected set of quantized color data values represented in the first color space components;

(b) calculating color indices for storage in a first look-up table by:
  i) calculating a second color space value for each one of the preselected quantized color data values;
  ii) ascertaining a feasibility of each second color space value calculated in step i);
  iii) identifying each quantized color data value corresponding to a feasible second color space value as ascertained in step ii);
  iv) mapping each quantized color data value corresponding to a non-feasible second color space value, as ascertained in step ii), to a representative feasible second color space value;
  v) assigning a unique color index to each feasible second color space value as ascertained in step ii) and to each representative feasible second color space value as mapped in step iv); and
  vi) pairing each quantized color data value with a respective one color index that corresponds to the feasible second color space value corresponding to the respective quantized color data value;

(c) utilizing each quantized color data value to look-up the corresponding color index stored in the first look-up table; and (d) utilizing each color index to look-up a corresponding n-bit data element stored in a second look-up table, wherein each corresponding n-bit data element further corresponds to the quantized color data value utilized to look-up the corresponding color index, and represents the corresponding quantized color data value in second color space components.

5. The method of claim 4 comprising the further step of:

calculating the corresponding n-bit data elements by calculating an n-bit data element for each feasible second color space value and pairing each calculated n-bit data element with a respective one color index that corresponds to the feasible second color space value corresponding to the respective calculated n-bit data element.

6. The method of claim 4 wherein the step of mapping is carried out by:
  i) projecting each quantized color data element corresponding to a non-feasible second color space value to a feasible second color space value;

ii) listing each feasible second color space value determined in the projecting step i) in a predetermined order;

iii) selecting certain ones of the feasible second color space values listed in the listing step ii), as a function of the predetermined order, to be the representative feasible second color space values; and iv) pairing each representative feasible second color space value with at least one quantized color data value corresponding to a non-feasible second color space value.

7. The method of claim 6 wherein the predetermined order comprises a shortest distance to longest distance order wherein distance represents geometric distance from each quantized color data value to its projected-to feasible second color space value.

8. The method of claim 4 wherein the step of calculating color indices includes the further steps of:

determining whether any of the preselected set of quantized color data values corresponding to feasible second color space values correspond to a black or white second color space value;

assigning a color index to a black second color space value when none of the quantized color data values corresponds to a black second color space value; and assigning a color index to a white second color space value when none of the quantized color data values corresponds to a white second color space value.

* * * * *